(12) United States Patent
Smith et al.

(10) Patent No.: US 7,699,378 B2
(45) Date of Patent: Apr. 20, 2010

(54) MOTION ASSIST MECHANISM FOR A VEHICLE TAILGATE

(75) Inventors: Michael D. J. Smith, Aurora (CA); Bradley F. Patzer, Barrie (CA); Stanislav Magovski, Hamilton (CA)

(73) Assignee: Ventra Group, Inc., Ontario (CA)

( * ) Notice: Subject to any disclaimer, the term of this patent is extended or adjusted under 35 U.S.C. 154(b) by 0 days.

(21) Appl. No.: 12/199,303

(22) Filed: Aug. 27, 2008

(65) Prior Publication Data

US 2009/0058131 A1  Mar. 5, 2009

Related U.S. Application Data

(60) Provisional application No. 60/968,420, filed on Aug. 28, 2007.

(51) Int. Cl.
*B62D 33/033* (2006.01)
(52) U.S. Cl. .......................... 296/57.1; 16/303; 16/306; 16/308; 49/386
(58) Field of Classification Search .................. 296/50, 296/57.1, 146.8, 146.11; 16/330, 327, 306–308, 16/303; 49/386, 387
See application file for complete search history.

(56) References Cited

U.S. PATENT DOCUMENTS

| | | | | |
|---|---|---|---|---|
| 365,158 | A | * | 6/1887 | Duzer .................... 160/368.2 |
| 571,133 | A | * | 11/1896 | Hoffman .................... 16/303 |
| 757,805 | A | * | 4/1904 | Ford-Smith et al. ........... 464/60 |
| 771,608 | A | * | 10/1904 | Chaffee .................... 16/330 |
| 1,078,002 | A | * | 11/1913 | Schrey .................... 16/330 |
| 1,356,039 | A | * | 10/1920 | Cartwright .................... 16/330 |
| 2,890,477 | A | * | 6/1959 | Miller .................... 16/322 |
| 2,984,517 | A | | 5/1961 | Farrow |
| 3,031,225 | A | | 4/1962 | Saffer |
| 3,085,286 | A | | 4/1963 | Whitehouse |
| 3,166,783 | A | | 1/1965 | Mackie |
| 3,243,175 | A | | 3/1966 | Sherwood |
| 3,258,289 | A | | 6/1966 | Malinowski |
| 3,518,716 | A | * | 7/1970 | Larson .................... 16/284 |
| 3,656,801 | A | * | 4/1972 | Doutt et al. ............... 296/57.1 |
| 3,815,685 | A | | 6/1974 | Seifert, Jr. |
| 3,848,918 | A | * | 11/1974 | Dyer .................... 296/57.1 |
| 4,152,011 | A | | 5/1979 | Sano |
| 4,215,449 | A | * | 8/1980 | Loikitz .................... 16/50 |
| 4,589,164 | A | | 5/1986 | Leonard |
| 4,701,977 | A | | 10/1987 | Hori |
| 5,109,571 | A | * | 5/1992 | Ohshima et al. ............... 16/307 |
| 5,138,743 | A | * | 8/1992 | Hoffman .................... 16/303 |
| 5,358,301 | A | | 10/1994 | Konchan |

(Continued)

*Primary Examiner*—Patricia L Engle
(74) *Attorney, Agent, or Firm*—Pillsbury Winthrop Shaw Pittman LLP

(57) ABSTRACT

A motion assist hinge mechanism includes a first and second hinge part mounted to the tailgate and vehicle body, respectively. The first hinge part includes a first cam having a sloped engagement surface engaged with a sloped engagement surface of a second cam of the second hinge part, under the bias of a resilient member, for moving axially along a pivot axis. The second cam is fixed to the vehicle body against pivotal movement relative to the pivot axis. When the tailgate is moved from a lowered, open position towards a raised, closed position, the resilient member translates a torque assisting force to the tailgate. The surface of the second cam may also include a detent that mates with the surface of the first cam to lock the tailgate at an angle.

43 Claims, 10 Drawing Sheets

U.S. PATENT DOCUMENTS

| | | | |
|---|---|---|---|
| 5,682,644 A * | 11/1997 | Bohacik et al. | 16/284 |
| 5,799,371 A * | 9/1998 | Lin | 16/330 |
| 5,944,373 A | 8/1999 | Seksaria | |
| 5,966,776 A | 10/1999 | Ona | |
| 5,970,819 A * | 10/1999 | Katoh | 74/531 |
| 5,988,724 A | 11/1999 | Wolda | |
| 6,070,298 A * | 6/2000 | Sorimachi | 16/330 |
| 6,532,627 B2 * | 3/2003 | Audisio | 16/334 |
| 6,637,796 B1 | 10/2003 | Westerdale | |
| 6,769,729 B1 | 8/2004 | Bruford | |
| 6,793,263 B1 * | 9/2004 | Bruford et al. | 296/50 |
| 6,796,592 B1 | 9/2004 | Austin | |
| 6,846,030 B2 * | 1/2005 | Koehler et al. | 296/50 |
| 6,874,837 B2 * | 4/2005 | Bruford et al. | 296/50 |
| 6,905,156 B2 * | 6/2005 | Miller et al. | 296/50 |
| 7,096,536 B2 * | 8/2006 | Johnson | 16/300 |
| 7,103,938 B2 | 9/2006 | Bruckner | |
| 7,156,441 B2 | 1/2007 | Austin | |
| 7,195,300 B2 * | 3/2007 | Austin | 296/57.1 |
| 7,213,858 B2 * | 5/2007 | Smith | 296/57.1 |
| 7,373,692 B2 * | 5/2008 | Kfoury | 16/308 |
| 2003/0189354 A1 | 10/2003 | Fabiano | |
| 2005/0193523 A1 * | 9/2005 | Nam et al. | 16/330 |
| 2007/0039135 A1 * | 2/2007 | Duan et al. | 16/330 |
| 2009/0058131 A1 * | 3/2009 | Smith et al. | 296/146.11 |
| 2009/0064461 A1 * | 3/2009 | Yin et al. | 16/330 |
| 2009/0064462 A1 * | 3/2009 | Yin et al. | 16/330 |

* cited by examiner

MOTION ASSIST MECHANISM FOR A VEHICLE TAILGATE

REFERENCE TO RELATED APPLICATIONS

This Application claims priority to U.S. Provisional Patent Application Ser. No. 60/968,420, filed Aug. 28, 2007, which is hereby incorporated by reference herein in its entirety.

BACKGROUND OF THE INVENTION

1. Field of Invention

The present invention is generally related to a hinge. More particularly, the present invention relates to an assist mechanism for a hinge for use on a vehicle tailgate.

2. Background

One example of a prior art hinge mechanism for vehicle tailgates includes the use of a torque rod within the tailgate. The assembly of the torque rod through the tailgate generally requires additional time, costs, and operational steps. Torque rods also require specific service components and tailgate access when service or repair is required. Torque rods also do not assist in preventing the tailgate from disengaging.

Another example of a tailgate hinge mechanism includes gas struts. Gas struts are generally costly and also require specific service components and packaging needs.

U.S. Pat. No. 6,769,729 shows an example of a known assist mechanism for tailgates.

SUMMARY OF THE INVENTION

One aspect of the invention provides a vehicle including a body having an opening; a closure member for closing the opening, the closure member being pivotally mounted to the body at the opening for movement about a generally horizontal pivot axis between a raised position and a lowered position; and a pair of hinge mechanisms on opposing sides of the closure member. The hinge mechanisms pivotally mount the closure member for movement about the pivot axis. At least one of the pair of hinge mechanisms includes: a first hinge part mounted to the closure member and including a first cam having a sloped engagement surface and a second hinge part mounted to the body and comprising a second cam having a sloped engagement surface. The first and second cams may be provided along the pivot axis, with the first cam being fixed to the closure member for pivotal movement relative to the pivot axis along with the closure member, and the second cam being fixed to the body against relative movement to the pivot axis. A resilient member is associated with one of the first and second cams, the one of the first and second cams being movable axially along the pivot axis and the resilient member biasing the one of the first and second cams towards the other. The sloped engagement surfaces of the first and second cams may be engaged with one another under the biasing of the resilient member and configured such that the biasing of the resilient member is translated into a force applied to the closure member towards the raised position at least when between the raised and lowered positions.

In one embodiment, the sloped engagement surface of the second cam farther includes a detent. Rotation of the closure member causes the sloped engagement surface of the first cam to mate and lock within the detent and maintain the closure member at an angled position with respect to the body. The closure member may be a tailgate, for example.

Another aspect of the invention provides a vehicle including a body having a bed with an opening and a tailgate for closing the opening, the tailgate being pivotally mounted to the body at the opening for movement about a generally horizontal pivot axis between a raised closed position extending generally vertically and a lowered open position extending generally horizontally. A pair of hinge mechanisms may be provided on opposing sides of the tailgate, the hinge mechanisms pivotally mounting the tailgate for the movement about the pivot axis. At least one of the pair of hinge mechanisms provides a first hinge part mounted to the tailgate and including a first lock member and a second hinge part mounted to the body and including a second lock member. The first and second lock members may be provided along the pivot axis, with the first lock member being fixed to the tailgate for pivotal movement relative to the pivot axis along with the tailgate and the second lock member being fixed to the body against relative movement to the pivot axis. A resilient member may be associated with one of the first and second lock members, the one of the first and second lock members being movable axially along the pivot axis and the resilient member biasing the one of the first and second lock members towards the other. The first and second lock members include cooperating engagement portions configured to engage with one another under the biasing of the resilient member when the tailgate is in the open position, at least one of the cooperating engagement portions being contoured such that a predetermined force in the closing direction is required to urge the resilient member against its biasing to permit disengagement of the cooperating engagement portions.

In one embodiment, the sloped engagement surface of the second cam further includes a detent, and rotation of the closure member causes the sloped engagement surface of the first cam to mate and lock within the detent and maintain the closure member at an angled position with respect to the body.

In another aspect of the invention, a hinge mechanism is provided for a vehicle tailgate, including a first assembly constructed and arranged to be mounted to one of a vehicle tailgate and a vehicle body and a second assembly constructed and arranged to be mounted to the other of the vehicle tailgate and the vehicle body. The first assembly includes a first cam having a sloped engagement surface. The second assembly includes a second cam having a sloped engagement surface to cooperate and mate with the sloped engagement surface of the first cam. The first and second assemblies may be provided along a pivotal axis. A biasing member is arranged to rotationally lock the second cam with the second assembly and to urge the second cam to mate with the first cam, such that the rotation of the vehicle tailgate rotates the assembly mounted to the vehicle tailgate about the pivotal axis. Also, upon rotation of the tailgate, the sloped engagement surface of the first cam rotates about the pivotal axis relative to the sloped engagement surface of the second cam thus providing a torque for assisting in the rotation of the tailgate.

In one embodiment, the sloped engagement surface of the second cam farther includes a detent, and rotation of the closure member causes the sloped engagement surface of the first cam to mate and lock within the detent and maintain the closure member at an angled position with respect to the body.

An additional aspect of the invention provides a method for forming a hinge for a vehicle tailgate. The method includes providing a first assembly with a first cam having a sloped engagement surface; providing a second assembly with a second cam having a sloped engagement surface that cooperates and mates with the sloped engagement surface of the first cam; mating the first cam with the second cam using a biasing member; and providing a detent in the sloped engagement surface of the second cam that prevents the rotation of the sloped engagement surface of the first cam about a pivotal axis.

Other objects, features, and advantages of the present invention will become apparent from the following detailed description, the accompanying drawings, and the appended claims.

DETAILED DESCRIPTION OF THE PREFERRED EMBODIMENT(S) OF THE INVENTION

The drawings illustrate a motion assist device, generally indicated at 10, for a vehicle body with an opening, e.g., a pick-up truck bed. The motion assist device 10 is designed to be installed on a closure member, such as tailgate, for closing the opening on a pick-up truck or other pivoting closure member of a vehicle. For example, the device could be used to assist movement of a trunk lid, a hood, or any other closure member. In other variations, the motion assist device 10 could be used in other environments besides a vehicle. However, for understanding the function and construction of the device 10, it is be described in the context of a tailgate motion assist device used in the tailgate of a pick-up truck. For reference purposes, U.S. Pat. No. 6,769,729 is incorporated by reference in its entirety for showing the general construction of a vehicle tailgate and hinge components.

The closure member or tailgate is pivotally mounted to the body at the pick-up truck bed opening for movement about a generally horizontal pivot axis A. The tailgate extends generally horizontally along the pick-up truck bed opening. The tailgate is moved between a raised, closed position extending generally vertically and a lowered, open position extending generally horizontally using a pair of hinge mechanisms, for example. The hinge mechanisms are provided on opposing sides of the tailgate, and are used to pivotally mount the tailgate for movement about the pivot axis A with respect to the pick-up truck bed. Each hinge mechanism preferably comprises a motion assist device 10 comprising first hinge part 14 and a second hinge part 16. The first hinge part 14 is mounted to the closure member or tailgate 12, and the second hinge part 16 is mounted to the vehicle body or pick-up truck ends. The second hinge part 16 may be attached to vehicle pillars and is known for stable attachment.

Figure 1:
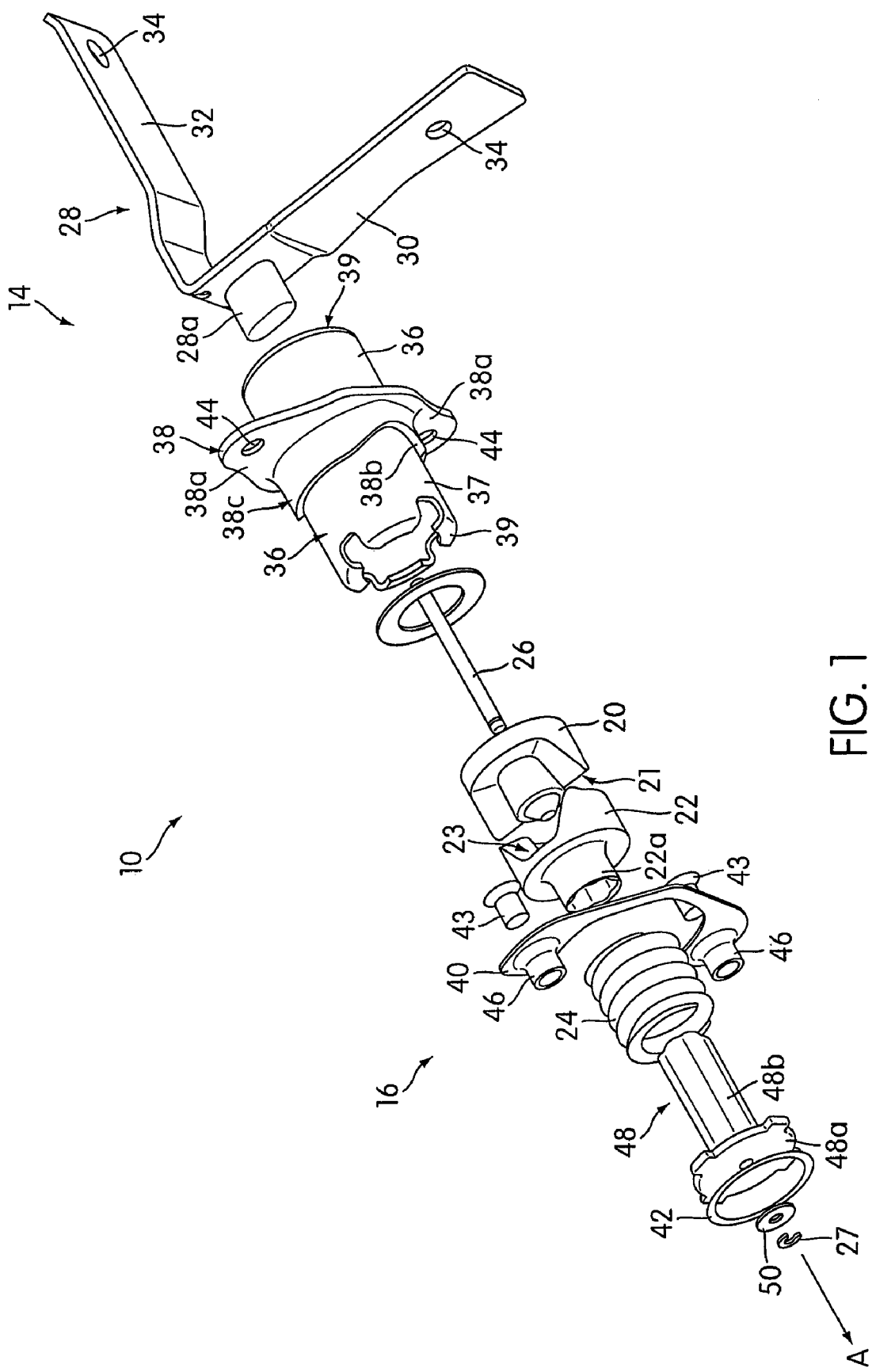
FIG. 1 is an exploded view of components in a motion assist device for use in a vehicle tailgate in accordance with an embodiment of the present invention.

FIG. 1 is an exploded view of the components in the motion assist device 10 for use in a vehicle tailgate in accordance with an embodiment of the present invention. Preferably, the motion assist device 10 is used with at least one of the pair of hinge mechanisms on either side of the tailgate, i.e., on the right side or on the left side, or both. In a preferred embodiment, working components are provided in a housing of the motion assist device 10 and are packaged behind or within the body at a side attachment area of the vehicle (e.g., the side of a truck bed), as will be described. In another embodiment, the housed components of the motion assist device 10 may be provided within the tailgate.

The motion assist device 10 comprises a first lock member 20 and a second lock member 22. First and second lock members 20, 22 are provided along the pivot axis A. The first lock member 20 is fixed to the closure member or tailgate for pivotal movement relative to the pivot axis A along with the tailgate. The second lock member 22 is fixed to the vehicle body against pivotal movement relative to the pivot axis A. In an embodiment, the first lock member 20 and second lock member 22 are fixed via a mounting bracket 28 and guide post 48, respectively.

In an embodiment, the first and second lock members 20, 22 are cams, wherein each cam has a cooperating engagement portion 21, 23, respectively. The cooperating engagement portions 21, 23 of the first and second cams 20, 22 are contoured and configured such that they may be engaged with one another in a working relationship. In a preferred embodiment, each of the engagement surfaces 21, 23 is sloped, wherein the sloped engagement surface of the first cam 20 is designed to engage and mate with the slope engagement surface of the second cam 22.

The first cam 20 comprises an attachment part 20a at the bottom thereof. Similarly, second cam 22 comprises an attachment part 22a. The attachment part 20a of the first cam 20 is used to attach the cam to a bracket 28. In an embodiment, the attachment part 20a may be an opening for receiving a post 28a of bracket 28. The attachment part 22a is used to attach the cam 22 to the guide post 48. In an embodiment, the attachment part 22a may comprise inner surfaces designed to cooperate with the outer surface of guide post 48. For example, guide post 48 may comprise protrusions for aligning attachment parts 22a of cam 22 thereon.

Also shown in FIG. 1 is a resilient member 24. Resilient member 24 may be a compressible spring, for example. One of the first and second cams is movable axially along the pivot axis A. The resilient member 24 is associated with one of the first and second lock members or cams 20, 22 and biases the first and second cams 20, 22 toward each other such that they are engaged with one another. In the illustrated embodiment, cam 22 moves along the axis A on post 48 and is biased by resilient member 24. The resilient member 24 is configured such that the biasing of the resilient member is translated into a force. For example, in an embodiment, when the tailgate is in the open position, the resilient member is biased, thus forcing and locking the surfaces 21, 23 of the first and second cams 20, 22 together.

In order to force the tailgate in a closing direction, a predetermined force must be applied in the closing direction to permit disengagement of the contoured, cooperating engagement portions 21, 23 (e.g., see description with respect to FIGS. 4-7 below). In another embodiment, the resilient member 24 is configured such that the biasing of the resilient member is translated into a force that is applied to the closure member or tailgate to assist in opening and closing. More specifically, when the tailgate is in the lowered, open position, a force applied (e.g., by a user) in the raised or closing direction utilizes the biasing force of the resilient member to translate the force into an assisting force or torque that is applied to the tailgate towards the raised or closed position. Further application and use of the resilient member 24 and cams 20, 22 will be described below.

As shown in the Figures, the resilient member 24 is associated with the second cam 22 in an embodiment. For example, the bottom of second cam 22 is formed such that it may receive part of resilient member 24 therein. Although the resilient member 24 will be further described below with reference to being associated with second cam 22 in the motion assist device 10, the description should not be limiting to its use with the second cam 22, and thus may include a method of biasing the first cam 20.

The motion assist device 10 also includes a mounting bracket 28. The mounting bracket 28 has a generally L-shaped configuration with a vertical wall 30 and a horizontal bottom wall 32. Both the vertical wall 30 and horizontal wall 32 of the bracket 28 have at least one opening 34 formed therethrough. The openings 34 may be used to mount the bracket 28 to the tailgate in a conventional manner, such as by securing devices or fasteners. In an embodiment, bracket 28 may also be attached through welding. Specifically, the bottom horizontal wall 30 is affixed to the bottom wall of the tailgate, and the vertical wall 32 is affixed to the vertical side walls of the tailgate. The bracket 28 also includes a connection part in the form of an extended post 28a for receiving first cam 20 thereon, for example, attaching via the attachment part 20a.

Figure 2:
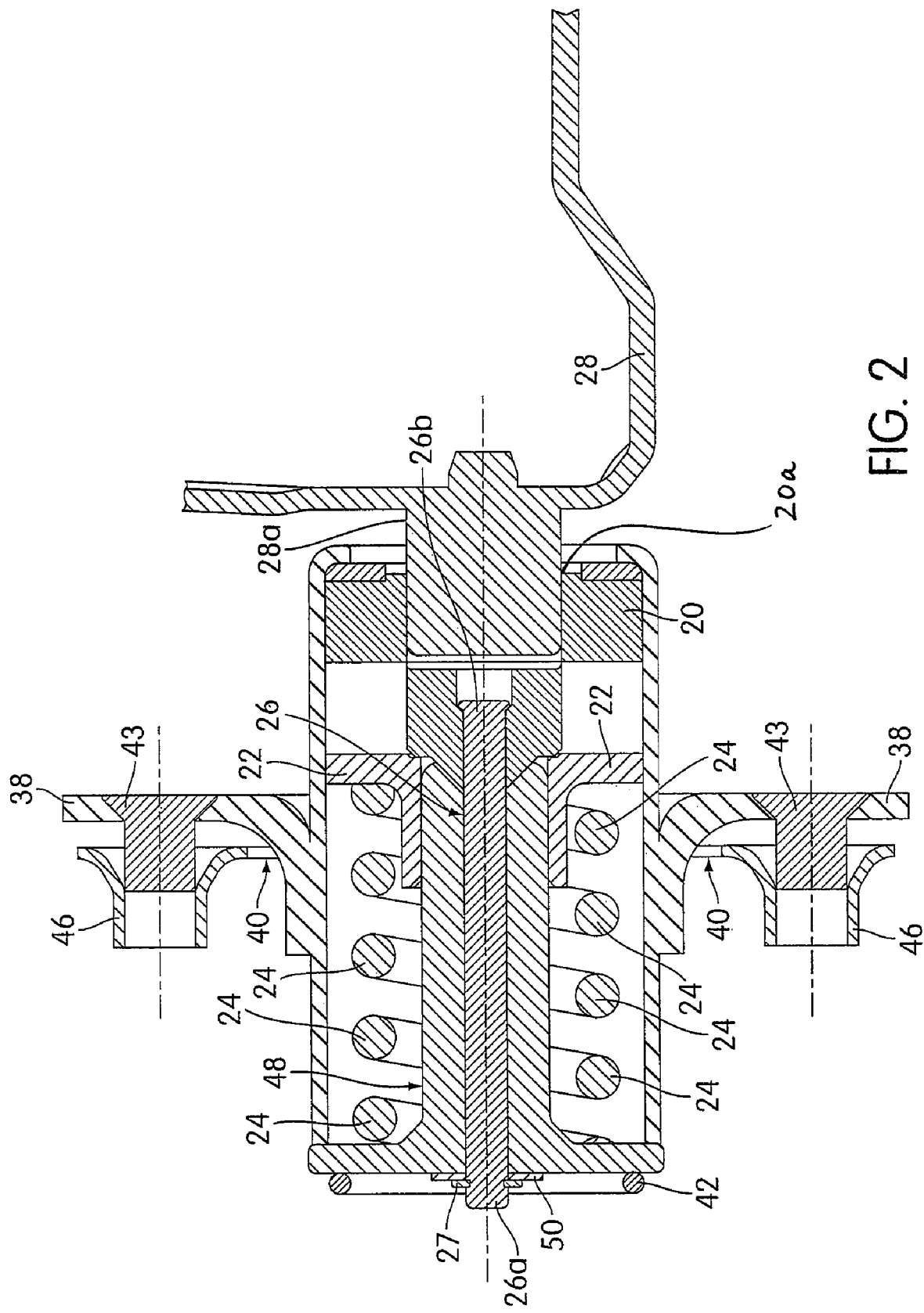
FIG. 2 is a cross-sectional view of the assembled motion assist device of FIG. 1.

Also provided in motion assist device 10 is a shaft 26 for holding second cam 22. The shaft 26 is provided along pivot axis A. FIG. 2 illustrates a cross-sectional view of the motion assist device 10 and the assembly of shaft 26 within the device 10. The shaft 26 is fed through first and second cams 20, 22 within housing 36 and through guide post 48 of the motion assist device 10. The shaft 26 may be secured at a first end 26a within the guide post 48 by using a lock washer 27 and/or washer 50, for example. The shaft 26 may be held at an opposite end 26b thereof within first cam 20. In an embodiment, end 26b may comprise a flanged end that sits within an opening of first cam 20. The shaft 26 assists in holding the sloped engagement surfaces of the cams 20 and 22 in a working relationship with each other, with respect to guide post 48, along pivot axis A.

Although the mounting bracket 28 is shown as a single or unitary element, in one embodiment, bracket 28 may also be formed from plurality of combination of elements that are attached together. For example, the bracket 28 may comprise a vertical piece and a horizontal piece (much like vertical wall 30 and horizontal wall 32) that are attached to each other using known attachment methods such as welding, fasteners devices, etc. Also, mounting bracket 28 may be formed of any appropriate material, such as metal.

Also shown in FIG. 1 are housing 36, bracket 38, and plate 40. The housing 36 encloses the first cam 20, second cam 22, resilient member 24, and additional parts of the motion assist device 10. The housing 36 is generally cylindrical in shape, comprising a cylindrical body 37 and ends 39. A bracket 38 is used to attach housing 36 to the vehicle body or tailgate. The bracket 38 is formed with sides 38a, central opening 38b, and a neck 38c extending from its center and around central opening 38b. The housing 36 is inserted into opening 38b and is attached to at the neck 38c of bracket 38. In an embodiment, neck 38c is not provided on the bracket 38; thus housing 36 is attached to the opening 38b of the bracket 38. The housing 36 and bracket 38 may be attached using attachment methods such as deformation or welding, for example. Likewise, it is possible to use other methods to attach housing 36 to bracket 38 in lieu of a mechanical attachment. For example, in an embodiment housing 36 and bracket 38 may be integrally molded.

In a preferred embodiment, as will be described, the bracket 38 is used to attach the housing 36 within the vehicle body (e.g., the side of the truck bed). In an alternate embodiment, the bracket 38 may be attached to the tailgate, such that the housing 36 and the parts therein are provided within the tailgate. Having these structures in the tailgate may be desirable if the structure of the vehicle body does not permit accommodation of the housing 36 and the structures therein, for example. The housing 36 is sealed via a crimping operation over an O-ring 42, such that lubricating materials (such as hydraulic fluid or oil) may be added within the enclosed housing 36.

The plate 40 is used as a support for mounting the motion assist device 10. The plate 40 is aligned with the bracket 38 for mounting the device 10 to the vehicle body. Specifically, the plate 40 is provided on the inside of the vehicle body 52 or truck bed and the bracket is aligned with the plate on the opposite or outside of the vehicle body 52. The bracket 38 includes mounting holes or openings 44 which are aligned with openings 46 on the plate 40. The openings 46 of the plate 40 include extruded tap holes for receiving securing device 43, for example. When aligned, the openings 44, 46 are along a common axis to receive securing devices 43 such as fasteners, bolts, or other suitable attachment devices to secure casing or housing 36 to the vehicle body 52.

FIG. 1 also illustrates the resilient member 24, O-ring 42, a guide post 48, and washers 50 of motion assist device 10. The guide post 48 comprises a flange end 48a and shaft or post 48b. The guide post 48 is provided to receive the shaft 26 therein. As noted above, when the shaft 26 is assembled inside guide post 48, the end of the shaft 26 may be locked using a lock washer 27. The post 48b also receives resilient member 24 thereon, such that the resilient member 24 is held between the end 48a of the guide post 48 and the second cam 22. The guide post 48 is also designed to receive and axially secure second cam 22. As noted above, in an embodiment, the post 48b of guide post 48 may comprise an outer surface with protrusions (or other known cooperative surface) along the outer surface thereof to cooperate with the inner surface of an attachment part 22a of the second cam 22, to further assist in aligning and securing or attaching cam 22 on guide post 48.

Figure 3:
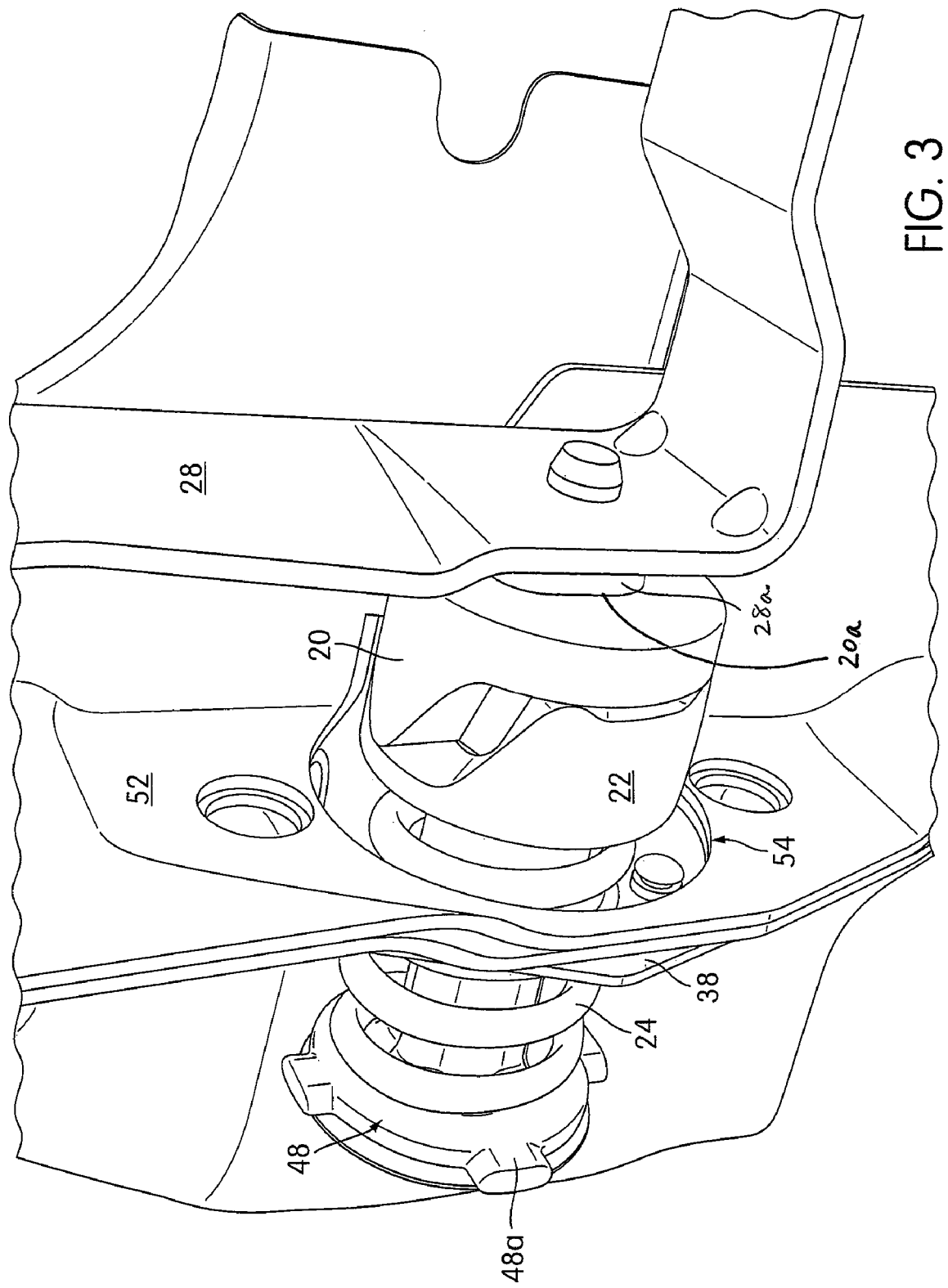
FIG. 3 is a detailed view of the motion assist device of FIG. 1 in a raised position.

To assemble the motion assist device 10 to the tailgate, the bracket 28 is mounted to the tailgate in a conventional manner, such as by securing fasteners through openings 34, or welding. Housing 36 is mounted to the vehicle body using bracket 38. Specifically, an end of the housing 36 is inserted through an attachment area or opening 54 in a vehicle body 52, such as shown in FIG. 3. The plate 40 is provided on the inside of the attachment area 54, surrounding at least part of the cylindrical body 37 of the housing 36. The tap holes or openings 46 of the plate 40 are then aligned within the openings in the attachment area 54 on the vehicle body 52. The bracket 38 is then applied to the outside of the attachment area 54, and openings 44 are aligned with the openings in the attachment area 54 and plate 40. The openings 44 in bracket 38 and the openings 46 in plate 40 may thus be aligned with vehicle body 52 therebetween and joined using securing devices 43 such as bolts, for example. The bolts 43 are threaded through the side of a vehicle truck bed 52 and into the extruded tap holes 46 of the plate 40 for securement of the motion assist device 10.

Figure 4:
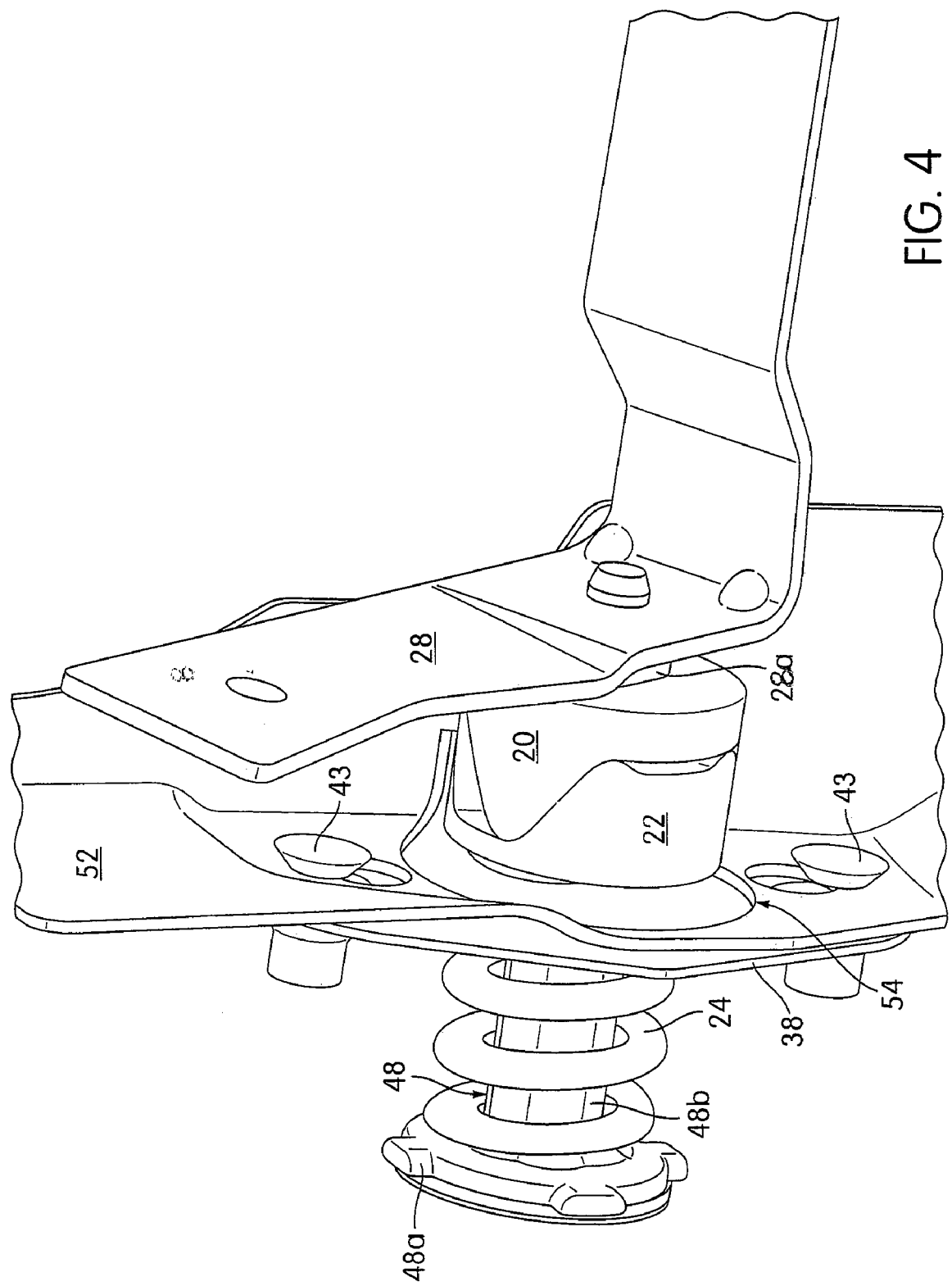
FIG. 4 is a detailed view of the motion assist device of FIG. 1 at an angle.
Figure 5:
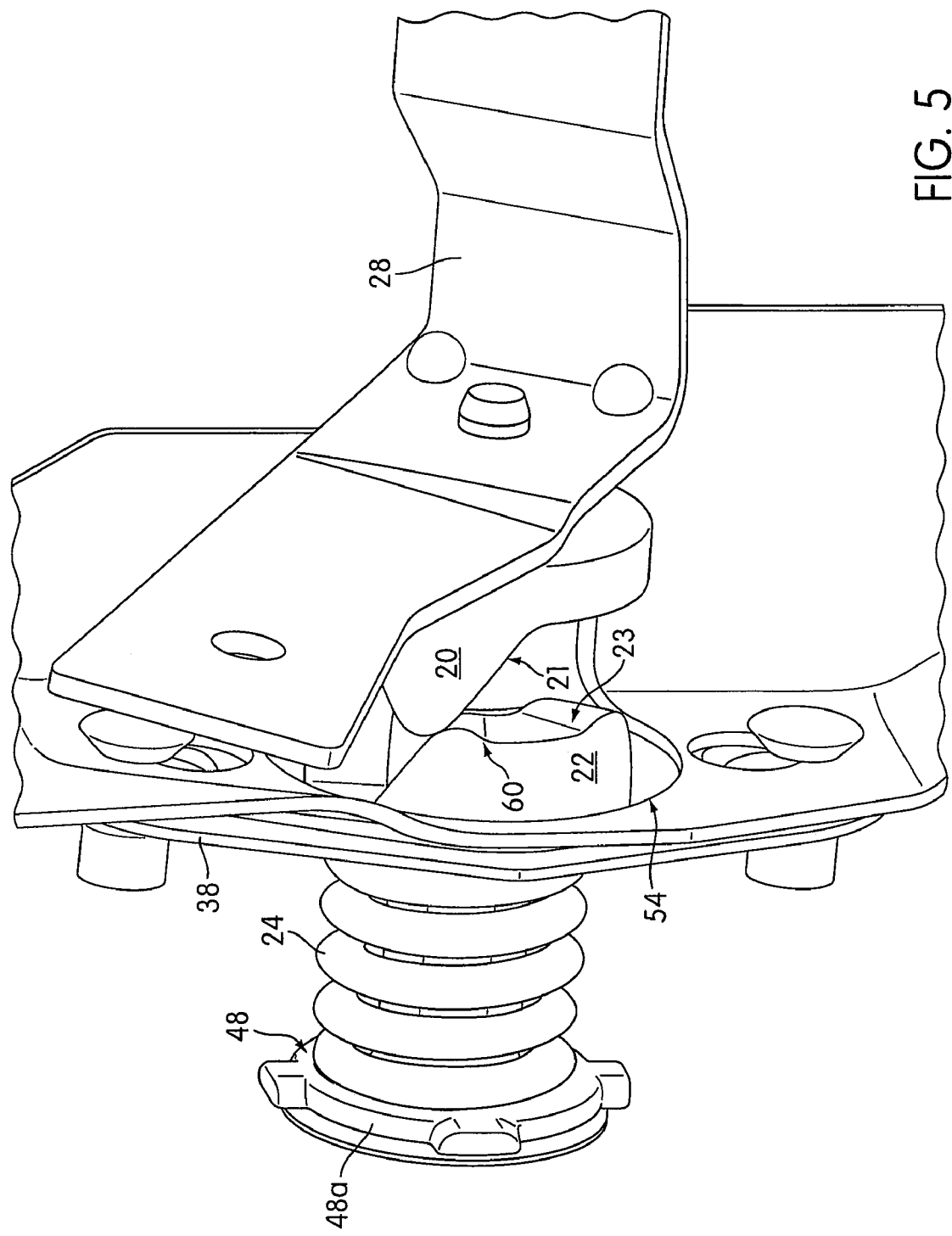
FIG. 5 is a detailed view of the motion assist device of FIG. 1 at a second angle.
Figure 6:
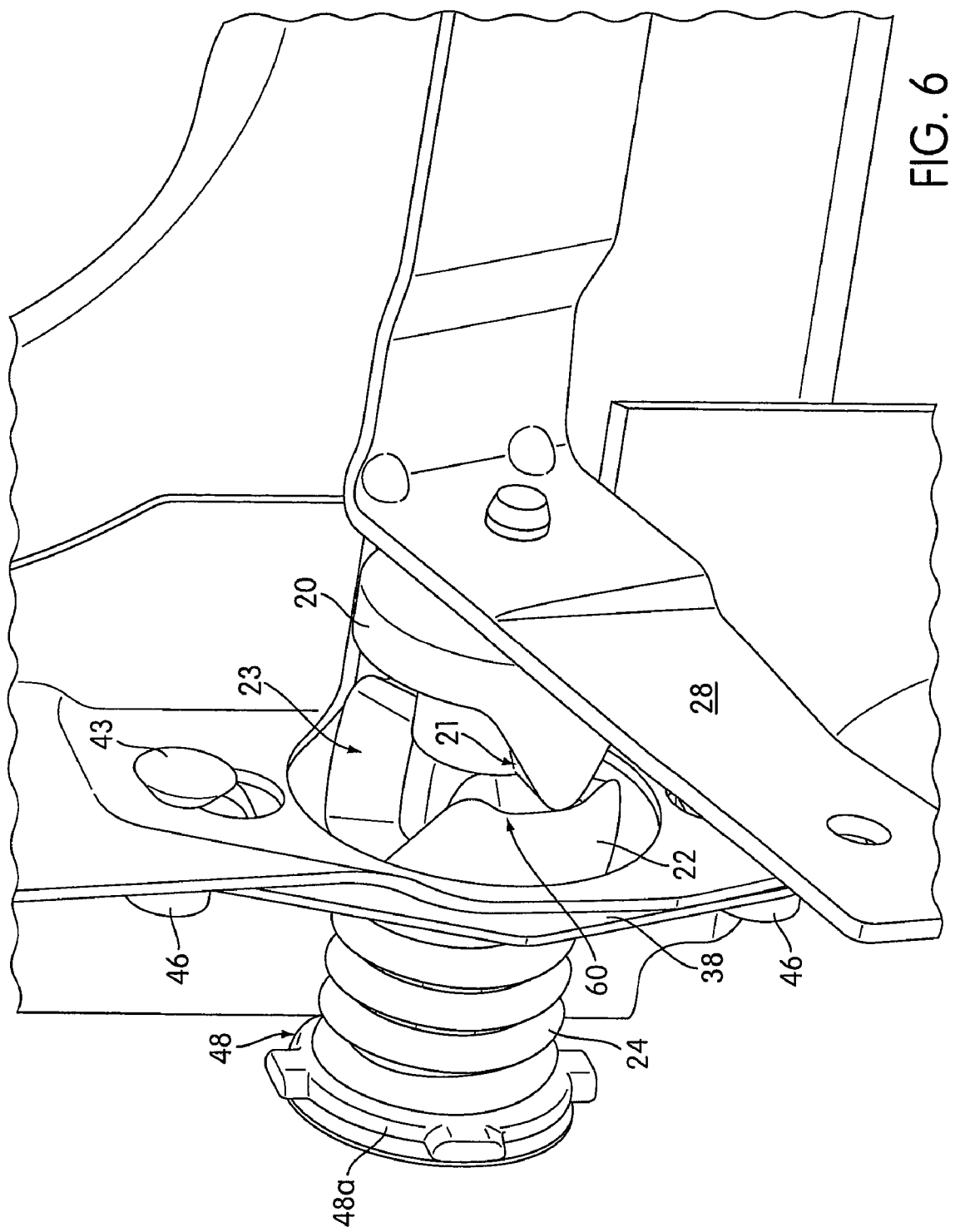
FIG. 6 is a detailed view of the motion assist device of FIG. 1 in a lowered position.

As shown in FIGS. 2 and 3, when the motion assist device is attached the vehicle body 52 and the tailgate is in a raised, closed position, the resilient member 24 is at rest or in a relaxed condition. The device may not be fully released, and still under some compression. FIGS. 4, 5, and 6 illustrate a detailed view of the rotation biasing of resilient member and the interaction and cooperation of the engagement surfaces 21, 23 of the first and second cams 20, 22 during rotation of the tailgate. As the tailgate is rotated along the pivot axis A from a raised position to a lowered position, the engagement surface 21 of the first cam 20 rotates relative to the engagement surface 23 of the second cam 22. As the first cam 20 rotates with respect to the second cam 22, the second cam 22 slides or moves axially along the guide post 48 and the shaft 26 (i.e., on axis A). Additionally, the resilient member 24 is slowly biased and compressed within housing 36 and along guide post 48 and generally horizontal pivot axis A. FIG. 4 shows the action of the motion assist device 10 when the tailgate is rotated open at about 30 degrees. As the tailgate is rotated further toward a lowered, open position, the resilient member 24 is further compressed along pivot axis A. Specifically, resilient member 24 is compressed as second cam 22 moves along shaft 26 and into vehicle body 52, such as represented by an opening of the tailgate to about 60 degrees as shown in FIG. 5. Also, the sloped engagement surface 21 of first cam 20 is shown pivotally moving relative to the pivot axis A and along with tailgate with respect to the rotatably fixed second cam 22.

The rotation of the first cam 20 relative to the second cam 22 forces the second cam 22 to translate outwardly (e.g., into vehicle body 52), thus forcing the resilient member 24 to compress between the end 48a of the guide post 48 and the second cam 22 (see FIGS. 5 and 6). The reaction force pushing back on cam 22 is translated by the engagement of surfaces 21, 23 into a force on cam 20 and the tailgate in the closing direction. This relieves some of the load of the tailgate as it is being lowered.

Figure 7:
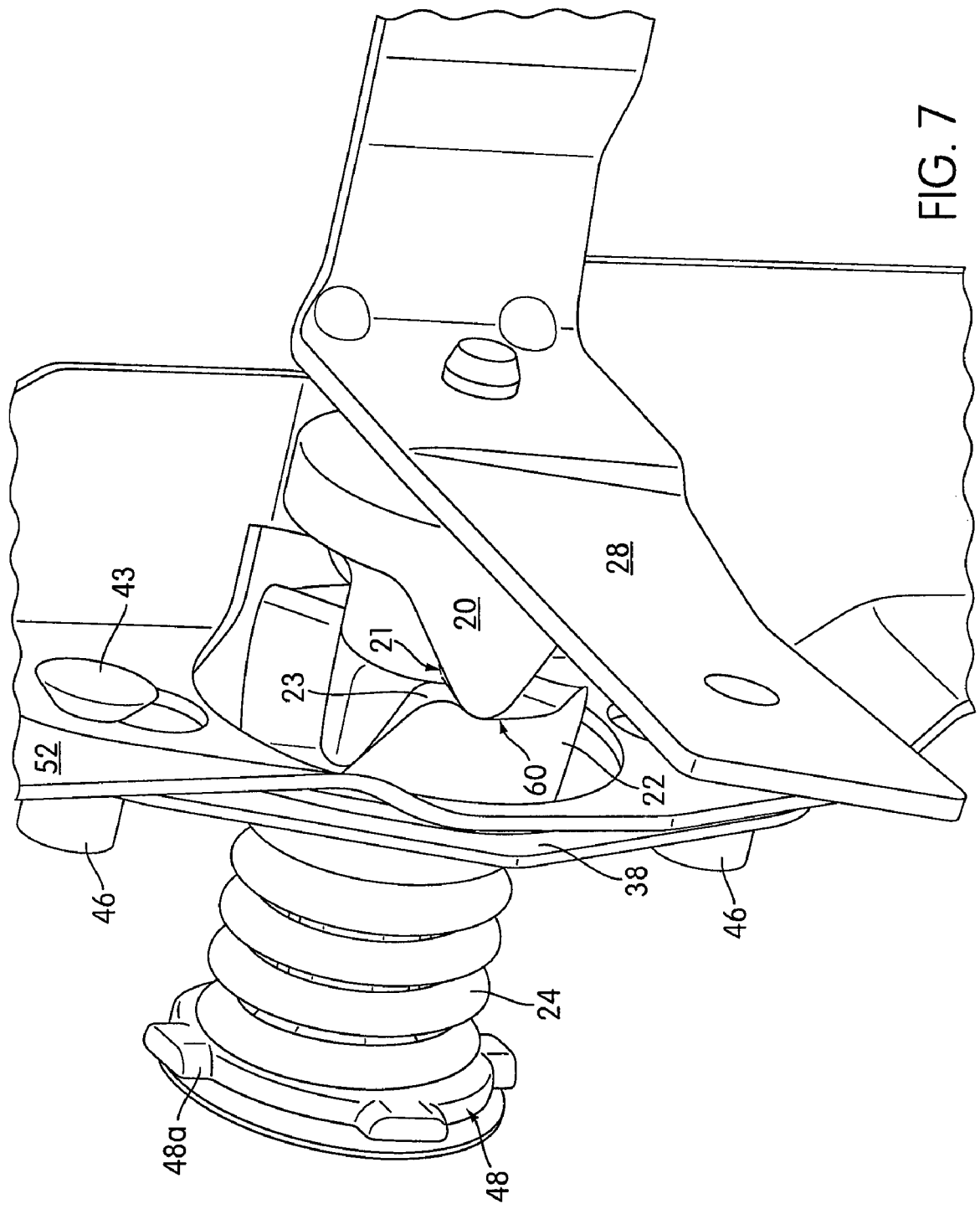
FIG. 7 is a detailed view of the motion assist device of FIG. 1 at a third angle, wherein the vehicle tailgate is in a locked position using a detent of a second cam.

When the tailgate is in a lowered position, as shown in FIGS. 6 and 7, the resilient member 24 is in a compressed condition. The compression of the resilient member 24 forces the resilient member 24 to store potential energy that will be transformed into kinetic energy (i.e., a force or torque) that will be transferred to the tailgate to assist in closing the vehicle tailgate 12. Thus, during rotation of the tailgate from the lowered, open position toward the raised, closed position, the resilient member 24 is decompressed, releasing its stored potential energy and transforming it to kinetic energy to provide a lift or motion assist torque through the movement of cam 22 and rotation of the cam 20, bracket 28 and other elements via axis A.

FIGS. 6 and 7 also show an embodiment wherein the second cam 22 comprises a detent 60. The detent 60 is provided on the engagement surface 23 of second cam 22. The detent 60 is provided to releasably lock the tailgate at an angle in the open position. Locking the engagement surfaces 21, 23 together using detent 60 at an angled position prevents the tailgate from moving or bouncing while in the open position. The detent 60 may be provided at a location on the second cam 22 corresponding to when the tailgate is lowered or open near approximately 80 degrees (with respect to the vehicle body or truck bed).

During rotation of the tailgate, the sloped engagement surface 21 of the first cam 20 rotates over the sloped engagement surface 23 of cam 22 and into detent 60, thus mating and locking the surface 21 of cam 20 within the detent 60. The tailgate is therefore maintained at an angled position with respect to the vehicle body 52. When the engagement surface 21 of cam 20 is rotated over the surface 23 and into detent 60, the resilient member 24 extends and relaxes a predetermined amount, thus preventing the tailgate from rotating closed (or open) without some effort or force sufficient to compress the spring for allowing cam 20 to clear the protrusion of detent 60. This is beneficial for limiting bouncing of the tailgate in the fully open position. It also assists in preventing the tailgate from falling to an open position due to gravity, for example (thus producing noise or loud sounds as it opens). Once the user provides such effort and imparts the required force to the tailgate, the first cam 20 rotates and slides out of the detent 60 of the second cam 22 and continues to travel down the sloped engagement surface 23. Thus, the motion assist device 10 then provides the previously described lift or torque assist for closing the tailgate.

The detent 60 may be provided such that it holds the tailgate in any angled position. For example, the tailgate may be held at a lowered, open position, such as greater than 90 degrees. To release the tailgate from the locked position, the user provides the required effort to close the tailgate, and, when the tailgate is open approximately 75 degrees, the first cam 20 is free to rotate with respect to second cam 22, thus providing motion assistance to the user to close the tailgate.

In an embodiment, any number of detents may be provided on the second cam 22 such that the tailgate may be locked in any number of angled positions.

The design of the motion assist device 10 is compact and thus provides a user with the ability to easily package the device in the vehicle body and tailgate as compared to other designs. For example, the use of the bracket 38 in the side of the vehicle body is easily assembled with fastening devices such as M10 bolts at a customer plant or facility, as opposed to two separate operations that may be required when assembling other torque rod devices. The motion assist device 10 is easily serviceable and does not require special service components or access to the tailgate when in need of service or repair. Thus, the design is advantageous as it decreases the production steps, the amount of time for assembly, and overall costs (e.g., labor).

Due to frictional forces between cams 20, 22 and the compression of the resilient member 24 as the first cam 20 rotates relative to the second cam 22, the speed of opening the tailgate in the motion assist device 10 may be decreased in an embodiment. If desired, the motion assist device 10 may be adjusted such that a user must provide some effort to open the tailgate into the lowered, open position. For example, since the motion of rotating the tailgate increases the frictional forces between the cams 20, 22 and the compression of the resilient member 24, and the motion assist device 10 may require an increase in force per degree of rotation by the user when opening the tailgate.

Conversely, in an alternate embodiment, as the tailgate is being lowered from its raised, closed position to its lowered, open position, the resilient member 24 may be provided to relieve some of the weight of the tailgate.

In an embodiment, the motion assist device 10 may be provided on one hinge mechanism that pivotally mounts the closure member or tailgate for movement about the pivot axis A with respect to the vehicle body. In an alternate embodiment, the motion assist device 10 is provided on each hinge mechanism on opposing sides of the tailgate.

In another embodiment, the motion assist device 10 may be provided to work in cooperation with a torque rod lift assist system to provide additional lift assistance to a tailgate.

Figure 8:
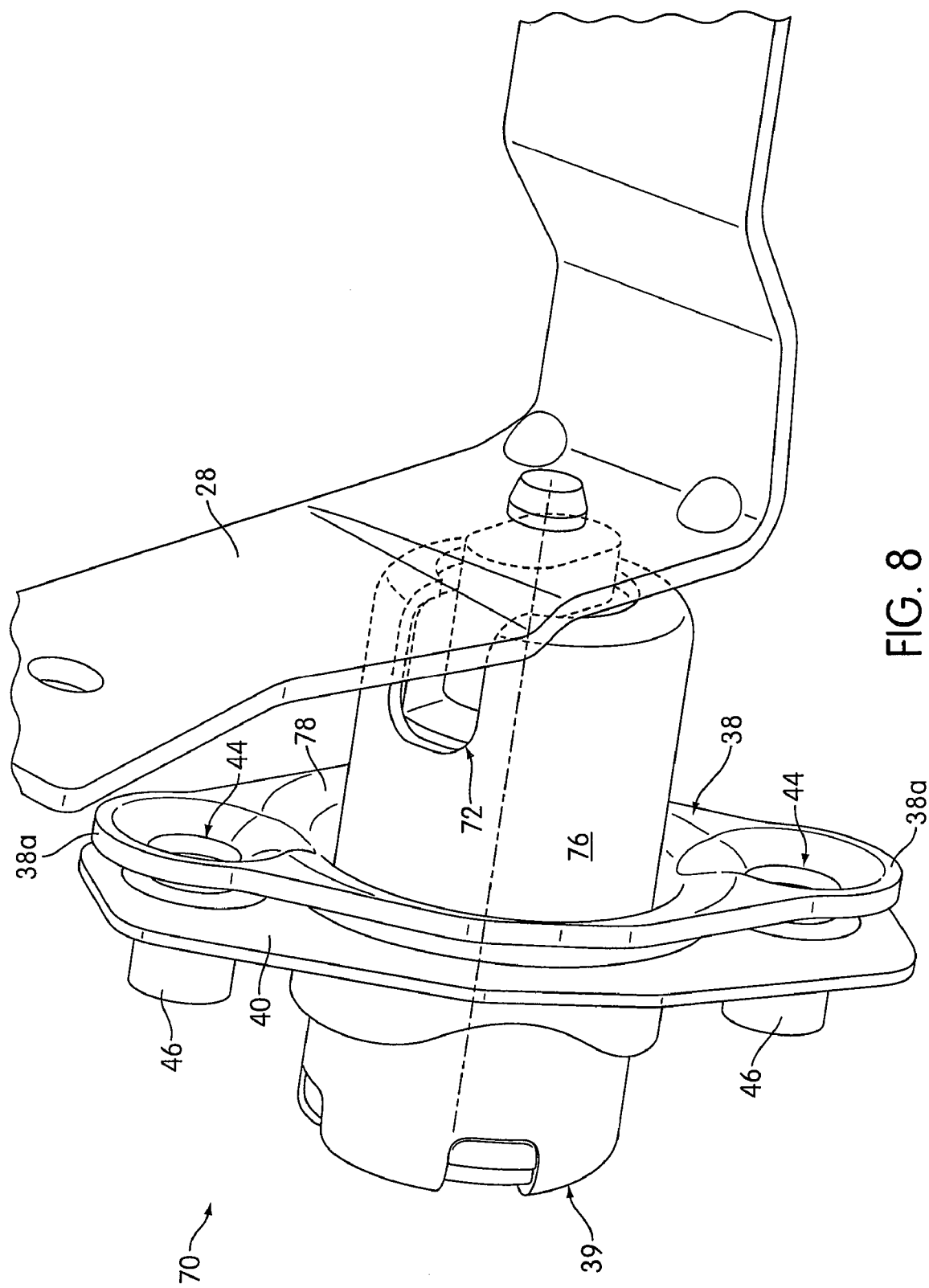
FIG. 8 is a detailed view of a housing and guide post for a motion assist device for use in a vehicle tailgate in accordance with an embodiment of the present invention.
Figure 10:
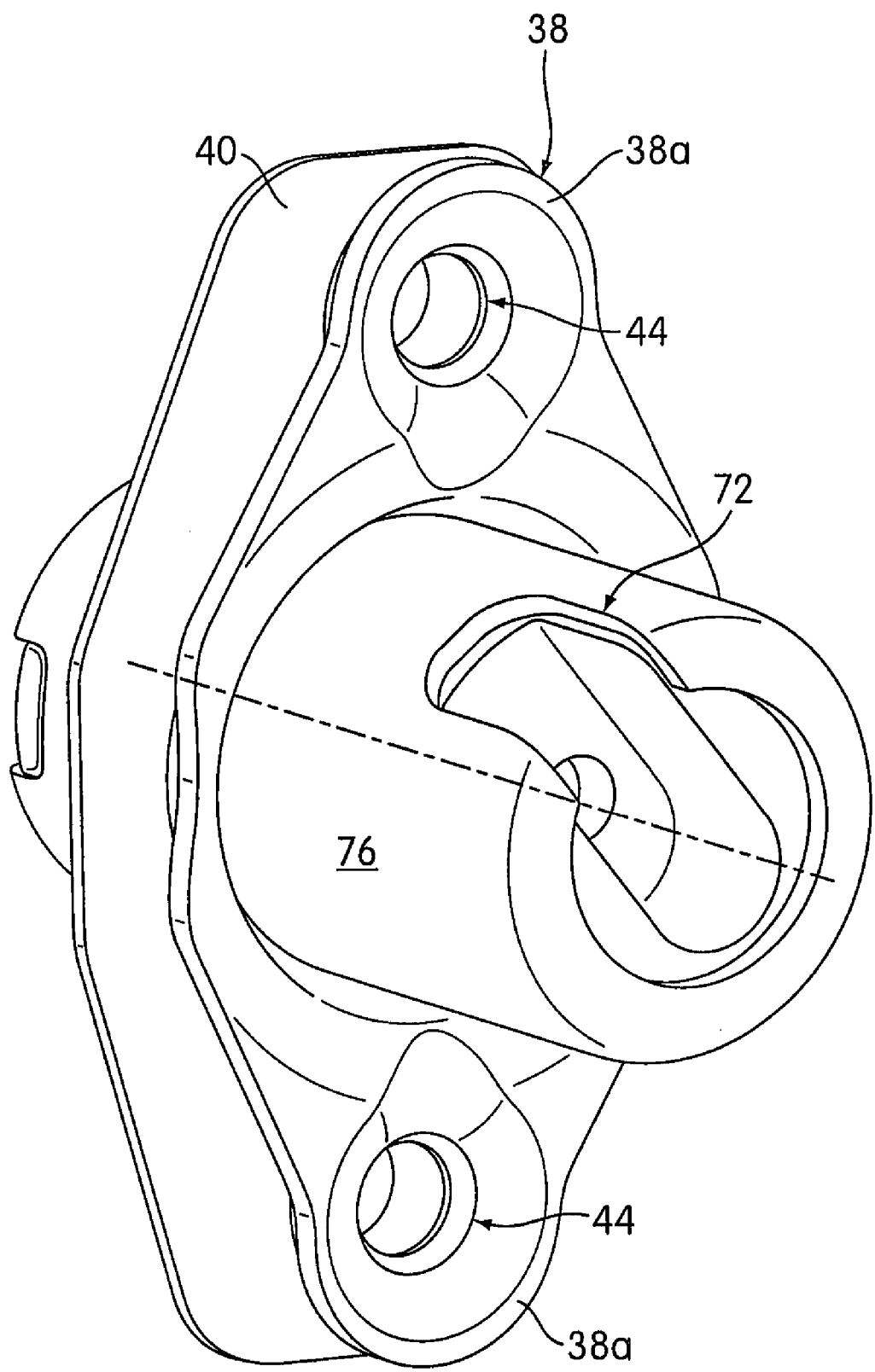
FIG. 10 is a perspective view of the motion assist device of FIG. 8.

FIG. 8 is a detailed view of a housing 76 and guide post 78 for a motion assist device 70 for use in a vehicle tailgate in accordance with an embodiment of the present invention. The motion assist device 70 of FIG. 8 comprises a notch 72 within the housing 76, shown in detail in FIG. 10. The notch 72 is provided in the housing 76 to assist in engaging the bracket 28 with the housing 76. For example, the notch 72 assists in providing ease of removing a tailgate, such as when a tailgate needs to be removed from a vehicle body for repair or other known reasons.

Figure 9:
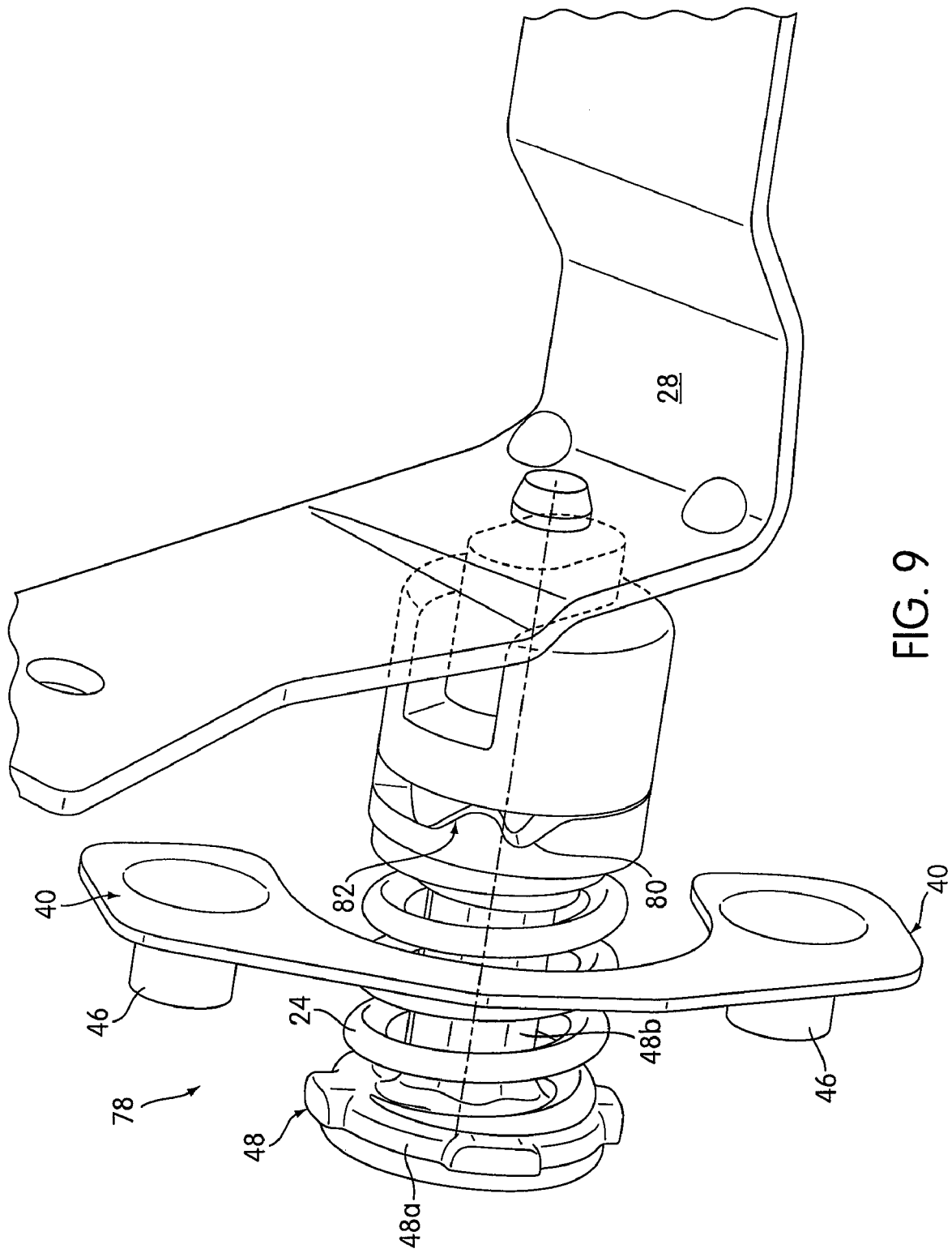
FIG. 9 is a detailed view of the motion assist mechanism within the motion assist device of FIG. 8.

FIG. 9 shows a detailed view of the motion assist mechanism 78 within the motion assist device 70 of FIG. 8. The design, features, and elements of motion assist mechanism 78 provides a substantially similar design, features, and elements as previously described with reference to FIGS. 2-7. Additionally, the motion assist device 70 allows for using the cam devices as a dampening mechanism as well as for locking a tailgate into open positions by using a detents 80, 82.

In an embodiment, the motion assist device 70 may also be used in conjunction with a torque rod lift assist system, such as the system and method described in U.S. Patent Application Ser. No. 60/780,858, filed Mar. 10, 2006, which is herein incorporated by reference in its entirety. Thus, in an embodiment, motion assist device 70 may be smaller in size and allow for easier packaging within the available space (e.g., in the vehicle body or in the tailgate).

The above described components of the motion assist device 10 are not meant to be limiting. For example, seals, liners, or other devices may be provided to reduce friction, noise and wear between the parts of the motion assist device 10. Additionally, the materials used in the device 10 should not be limiting.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A vehicle comprising:
a body having an opening;
a closure member for closing the opening, the closure member being pivotally mounted to the body at the opening for movement about a generally horizontal pivot axis between a raised position and a lowered position;
a pair of hinge mechanisms on opposing sides of the closure member, the hinge mechanisms pivotally mounting the closure member for the movement about the pivot axis and permitting removal of the closure member from the body;
wherein at least one of the pair of hinge mechanisms comprises:
a housing fixedly connected to one of the body and the closure member and a connection part fixedly connected to the other of the body and the closure member;
a first cam and a second cam, the first and second cams each having a sloped engagement surface;
the first and second cams being provided within the housing along the pivot axis, with the first cam being mounted for enabling relative pivotal movement between the first cam and the housing and the second cam being fixed against pivotal movement relative to the housing;
the first cam and the connection part being removably connectable together to permit the removal of the closure member from the vehicle;
a resilient member provided within the housing and associated with the second cam, the second cam being movable axially along the pivot axis within the housing and the resilient member biasing the second cam towards the first cam;
the sloped engagement surfaces of the first and second cams being engaged with one another under the biasing of the resilient member and configured such that relative pivotal movement between the first cam and the housing as the closure member is moved in an opening direction towards the lowered position axially displaces the second cam along the pivot axis within the housing to stress the resilient member, so that the biasing of the resilient member is translated into a force applied to the closure member in a closing direction towards the raised position.

2. A vehicle according to claim 1, further comprising a torque rod working in cooperation with the hinge mechanism, wherein the torque rod is rotated along the pivot axis.

3. A vehicle according to claim 1, further comprising a detent in the sloped engagement surface of the second cam, wherein rotation of the closure member causes the sloped engagement surface of the first cam to mate and lock within the detent and maintain the closure member at an angled position with respect to the body.

4. A vehicle according to claim 3, wherein the cams are locked at the angled position until a force sufficient enough to cause the sloped engagement surface to disengage from the detent is applied.

5. A vehicle according to claim 3, wherein the cams are locked at the angled position with respect to the body that is equal to or less than approximately 80 degrees.

6. A vehicle according to claim 1, wherein when the closure member is rotated from the raised position to the lowered position, the resilient member is stressed by compression.

7. A vehicle according to claim 6, wherein when the closure member is rotated from a lowered position to the raised position, the resilient member is decompressed and provides torque to assist in the rotation of the closure member.

8. A vehicle according to claim 1, wherein the housing is mounted within the body.

9. A vehicle according to claim 1, wherein the housing is mounted within the closure member.

10. A vehicle according to claim 1, wherein the closure member is a tailgate.

11. A vehicle according to claim 1, wherein the first cam comprises an attachment part, and wherein the connection part comprises an extended post for extending into the housing and attaching to the attachment part of the first cam.

12. A vehicle according to claim 11, wherein the housing further comprises a notch open radially and axially for the extended post to extend axially into the attachment part of the first cam and to be inserted and removed therethrough in a radial direction with respect to the pivot axis.

13. A vehicle according to claim 1, further comprising a shaft configured to hold each of the sloped engagement surfaces of the first and the second cams in engagement with each other along the pivot axis, the shaft and the first cam connected together within the housing.

14. A vehicle comprising:
a body having a bed with an opening;

a tailgate for closing the opening, the tailgate being pivotally mounted to the body at the opening for movement about a generally horizontal pivot axis between a raised closed position extending generally vertically and a lowered open position extending generally horizontally;

a pair of hinge mechanisms on opposing sides of the tailgate, the hinge mechanisms pivotally mounting the tailgate for the movement about the pivot axis and permitting removal of the tailgate from the body;

wherein at least one of the pair of hinge mechanisms comprises:

a housing fixedly connected to one of the body and the closure member and a connection part fixedly connected to the other of the body and the closure member;

a first and a second lock member, the first and second lock members being provided within the housing along the pivot axis, with the first lock member being mounted for enabling relative pivotal movement between the first lock member and the housing and the second lock member being fixed against pivotal movement relative to the housing;

the first lock member and the connection part being removably connectable together to permit the removal of the tailgate from the vehicle;

a resilient member provided within the housing and associated with the second lock member, the second lock member being movable axially along the pivot axis and the resilient member biasing the one second lock member towards the first cam;

the first and second lock members including cooperating engagement portions configured to engage with one another under the biasing of the resilient member when the tailgate is in the open position, at least one of the cooperating engagement portions being contoured such that a predetermined force in the closing direction is required to cause relative pivotal movement between the first lock member and the housing to axially displace the second lock member against the biasing of the resilient member to permit disengagement of the cooperating engagement portions.

15. A vehicle according to claim 14, further comprising a torque rod working in cooperation with the assembly mounted to the vehicle tailgate wherein the torque rod is rotated along the pivotal axis.

16. A vehicle according to claim 14, further comprising a detent in one of the cooperating engagement surfaces of the first and second lock members, wherein rotation of the tailgate causes the cooperating engagement surface of the other of the first and second lock members to engage and lock within the detent and maintain the closure at an angled position with respect to the body.

17. A vehicle according to claim 16, wherein the lock members are locked at the angled position until a force sufficient enough to cause the cooperating engagement surface of the other to disengage from the detent is applied.

18. A vehicle according to claim 16, wherein the first and second lock members are locked at the angled position with respect to the body that is equal to or less than approximately 80 degrees.

19. A vehicle according to claim 14, wherein when the tailgate is rotated from the raised closed position to the lowered open position, the resilient member is stressed by compression.

20. A vehicle according to claim 19, wherein when the tailgate is rotated from a lowered open position to the raised closed position, the resilient member is decompressed and provides torque to assist in the rotation of the tailgate.

21. A vehicle according to claim 14, wherein the housing is mounted within the body.

22. A vehicle according to claim 14, wherein the housing is mounted within the tailgate.

23. A vehicle according to claim 14, wherein the first lock member comprises an attachment part, and wherein the connection part comprises an extended post for extending into the housing and attaching to the attachment part of the first lock member.

24. A vehicle according to claim 23, wherein the housing further comprises a notch open radially and axially for the extended post to extend axially into the attachment part of the first cam and to be inserted and removed therethrough in a radial direction with respect to the pivot axis.

25. A vehicle according to claim 14, further comprising a shaft configured to hold each of the sloped engagement surfaces of the first and the second cams in engagement with each other along the pivot axis, the shaft and the first cam connected together within the housing.

26. A hinge mechanism for a vehicle tailgate, comprising:
a housing constructed to fixedly connect the hinge mechanism to one of a vehicle tailgate and a vehicle body;
a connection part constructed to be fixedly connected to the other of the vehicle tailgate and the vehicle body;
a first cam provided within the housing and having a sloped engagement surface;
a second cam provided within the housing and having a sloped engagement surface to cooperate and mate with the sloped engagement surface of the first cam;
the first and second cams being provided within the housing along a pivot axis, with the first cam being mounted for enabling relative pivotal movement between the first cam and the housing and the second cam being fixed within the housing against pivotal movement relative to the housing;
the first cam and the connection part being removably connectable together to permit the vehicle tailgate to be installed on or removed from the vehicle body;
a resilient member provided within the housing, the second cam being movable axially along the pivot axis within the housing and the resilient member being arranged to bias the second cam axially along the pivot axis to mate with the first cam when the hinge assembly is installed, and
wherein the sloped engagement surface of the first and second cam members are configured such that, upon rotation of the tailgate when the hinge mechanism is installed, the sloped engagement surface of the first cam rotates about the pivotal axis relative to the sloped engagement surface of the second cam to axially displace the second cam against the bias of the resilient member, thus providing a torque for assisting in the rotation of the tailgate.

27. A hinge mechanism for a vehicle tailgate according to claim 26, further comprising a torque rod working in cooperation with the assembly mounted to the vehicle tailgate wherein the torque rod is rotated along the pivotal axis.

28. A hinge mechanism for a vehicle tailgate according to claim 26, further comprising a detent in the sloped engagement surface of the second cam, wherein rotation of the tailgate causes the sloped engagement surface of the first cam to mate and lock within the detent to maintain the tailgate at an angled position with respect to the vehicle body.

29. A hinge mechanism for a vehicle tailgate according to claim 28, wherein the cams are locked at the angled position until a force sufficient enough to cause the sloped engagement surface to disengage from the detent is applied.

30. A hinge mechanism according to claim 28, wherein the cams are locked at the angled position with respect to the vehicle body that is equal to or less than approximately 80 degrees.

31. A hinge mechanism for a vehicle tailgate according to claim 26, wherein when the tailgate is rotated from a closed position to an open position, the biasing member is stressed by compression.

32. A hinge mechanism for a vehicle tailgate according to claim 26, wherein when the tailgate is rotated from an open position to a closed position, the biasing member is decompressed thus providing torque to assist in the rotation of the tailgate.

33. A hinge mechanism according to claim 26, wherein the first cam comprises an attachment part, and wherein the connection part comprises an extended post for extending into the housing and attaching to the attachment part of the first cam.

34. A hinge mechanism according to claim 26, wherein the housing further comprises a notch open radially and axially for the extended post to extend axially into the attachment part of the first cam and to be inserted and removed therethrough in a radial direction with respect to the pivot axis.

35. A hinge mechanism according to claim 26, further comprising a shaft configured to hold each of the sloped engagement surfaces of the first and the second cams in engagement with each other along the pivot axis, the shaft and the first cam connected together within the housing.

36. A hinge mechanism for a vehicle tailgate, comprising:
a housing constructed to fixedly connect the hinge mechanism to one of a vehicle tailgate and a vehicle body;
a connection part constructed to be fixedly connected to the other of the vehicle tailgate and the vehicle body;
a first lock member provided within the housing;
a second lock member provided within the housing;
the first and second lock members being provided within the housing along a pivot axis, with the first lock member being mounted for enabling relative pivotal movement between the first lock member and the housing and the second lock member being fixed within the housing against pivotal movement relative to the housing;
the first lock member and the connection part being removably connectable together to permit the vehicle tailgate to be installed on or removed from the vehicle body;
a resilient member provided within the housing and associated with the second lock member to bias the second lock member towards the first lock member along the pivot axis when the hinge assembly is installed, the second lock member being movable axially along the pivot axis, and
wherein the first and second lock members include cooperating engagement portions configured to engage with one another under the biasing of the resilient member in a first position when the hinge mechanism is installed, at least one of the cooperating engagement portions being contoured such that a predetermined force in a second direction is required to cause relative pivotal movement between the first lock member and the housing to axially displace the second lock member against the biasing of the resilient member to permit disengagement of the cooperating engagement portions, thus providing a torque to assist in rotating the tailgate.

37. A hinge mechanism according to claim 36, further comprising a detent in one of the cooperating engagement surfaces of the first and second lock members, wherein rotation about the pivotal axis causes the cooperating engagement surface of the other of the first and second lock members to engage and lock within the detent.

38. A hinge mechanism according to claim 37, wherein the first and second lock members are locked at the angled position with respect to the vehicle body that is equal to or less than approximately 80 degrees.

39. A hinge mechanism according to claim 36, wherein the resilient member is stressed by compression when the first and second lock members are rotated about the pivotal axis from the second position to the first position.

40. A hinge mechanism according to claim 39, wherein the resilient member is decompressed when the first and second lock members are rotated about the pivotal axis from the first position to the second position, and wherein the resilient member provides torque to assist in the rotation of the tailgate.

41. A hinge mechanism according to claim 36, wherein the first lock member comprises an attachment part, and wherein the connection part comprises an extended post for extending into the housing and attaching to the attachment part of the first lock member.

42. A hinge mechanism according to claim 41, wherein the housing further comprises a notch open radially and axially for the extended post to extend axially into the attachment part of the first cam and to be inserted and removed therethrough in a radial direction with respect to the pivot axis.

43. A hinge mechanism according to claim 36, further comprising a shaft configured to hold each of the sloped engagement surfaces of the first and the second cams in engagement with each other along the pivot axis, the shaft and the first cam connected together within the housing.

* * * * *